United States Patent
Murata et al.

(10) Patent No.: US 7,751,076 B2
(45) Date of Patent: Jul. 6, 2010

(54) CONTROL APPARATUS USED IN IMAGE FORMING APPARATUS, CONTROL METHOD THEREFOR, AND IMAGE FORMING APPARATUS, HAVING A RELAY DEVICE, WITH IDENTIFICATION INFORMATION OBTAINING FEATURE FOR THE RELAY DEVICE

(75) Inventors: Mitsushige Murata, Yokohama (JP); Koji Doi, Yokohama (JP); Yoshihiro Funamizu, Abiko (JP); Kunio Tsuruno, Tokyo (JP); Toshio Hayashi, Toride (JP); Satoru Kanno, Kashiwa (JP); Akihito Mori, Toride (JP)

(73) Assignee: Canon Kabushiki Kaisha (JP)

( * ) Notice: Subject to any disclaimer, the term of this patent is extended or adjusted under 35 U.S.C. 154(b) by 957 days.

(21) Appl. No.: 11/534,438

(22) Filed: Sep. 22, 2006

(65) Prior Publication Data
US 2007/0070326 A1    Mar. 29, 2007

(30) Foreign Application Priority Data
Sep. 29, 2005   (JP)   ............................... 2005-285060

(51) Int. Cl.
*G06F 3/12*   (2006.01)
*G06K 15/00*   (2006.01)
(52) U.S. Cl. ..................... 358/1.15; 358/1.1
(58) Field of Classification Search .......... 358/1.1, 358/1.8, 1.13, 1.14, 1.15, 1.18, 400, 474, 358/468; 710/12, 20, 36–38, 305, 316
See application file for complete search history.

(56) References Cited

U.S. PATENT DOCUMENTS

| | | | | |
|---|---|---|---|---|
| 5,499,341 | A * | 3/1996 | Wilson et al. | 710/21 |
| 7,096,310 | B2 * | 8/2006 | Norden | 710/317 |
| 7,657,670 | B2 * | 2/2010 | Funamizu et al. | 710/38 |
| 2002/0091898 | A1 * | 7/2002 | Matsunami et al. | 711/114 |
| 2003/0126296 | A1 * | 7/2003 | Aviles | 709/250 |
| 2004/0088444 | A1 * | 5/2004 | Baumer | 710/1 |
| 2005/0138258 | A1 * | 6/2005 | Seto | 710/301 |
| 2006/0095605 | A1 * | 5/2006 | Lee et al. | 710/36 |
| 2008/0222325 | A1 * | 9/2008 | Ishino et al. | 710/60 |

FOREIGN PATENT DOCUMENTS

JP     08-297436 A     11/1996

* cited by examiner

*Primary Examiner*—Gabriel I Garcia
(74) *Attorney, Agent, or Firm*—Rossi, Kimms & McDowell LLP

(57) ABSTRACT

A control apparatus used in an image forming apparatus has a CPU board (100) and a relay board having I/Fs (311-314) and a CPU (301). The I/Fs are connectable with driver boards (5001-5004), and have common standards. The CPU detects each connection state of the driver boards to the I/Fs, decides an ID for the relay board according to the connection state, and performs consistency control to secure consistency of control between the driver boards, based on the ID for the relay board. The CPU board is communicatably connected to the relay board. The CPU board obtains the ID for the relay board 300, and performs control according to the ID for the relay board.

6 Claims, 17 Drawing Sheets

FIG. 14

○ : CONNECTED
× : UNCONNECTED

| | | | CORRESPONDING RELAY BOARD ID | | | | | | |
|---|---|---|---|---|---|---|---|---|---|
| | | | FEEDING | | CONVEYANCE | DOUBLE-SIDED CONVEYANCE | DEVELOPING DEVICE | | ALARM |
| | | | 100 | 101 | 200 | 300 | 400 | 401 | 001 |
| | | | INSEPARABLE | SEPARABLE | DEFAULT | DEFAULT | B/W | 4C | |
| DRIVER BOARD ID | FEEDING | 1 FEEDING MOTOR | ○ | ○ | × | × | × | × | |
| | | 2 LIFTER MOTOR | ○ | ○ | × | × | × | × | EXCEPT LEFT COMBINATIONS |
| | | 3 SEPARATE MOTOR | × | ○ | × | × | × | × | |
| | | 4 — | × | × | × | × | × | × | |
| | | 5 — | × | × | × | × | × | × | |
| | CONVEYANCE | 11 CONVEYANCE MOTOR | × | × | ○ | × | × | × | |
| | | 12 INVERSION MOTOR | × | × | ○ | × | × | × | |
| | | 13 — | × | × | × | × | × | × | |
| | | 14 — | × | × | × | × | × | × | |
| | | 15 — | × | × | × | × | × | × | |
| | DOUBLE-SIDED CONVEYANCE | 21 DOUBLE-SIDED CONVEYANCE MOTOR | × | × | × | ○ | × | × | |
| | | 22 — | × | × | × | × | × | × | |
| | | 23 — | × | × | × | × | × | × | |
| | | 24 — | × | × | × | × | × | × | |
| | | 25 — | × | × | × | × | × | × | |
| | DEVELOPING DEVICE | 31 BLACK | × | × | × | × | ○ | ○ | |
| | | 32 YELLOW | × | × | × | × | × | ○ | |
| | | 33 MAGENTA | × | × | × | × | × | ○ | |
| | | 34 CYAN | × | × | × | × | × | ○ | |

CONTROL APPARATUS USED IN IMAGE FORMING APPARATUS, CONTROL METHOD THEREFOR, AND IMAGE FORMING APPARATUS, HAVING A RELAY DEVICE, WITH IDENTIFICATION INFORMATION OBTAINING FEATURE FOR THE RELAY DEVICE

BACKGROUND OF THE INVENTION

Field of the Invention

The present invention relates to a control apparatus and a control method which are used in an image forming apparatus capable of attaching a plurality of units each of which is classified according to a function thereof and composed as a controlled unit, and an image forming apparatus.

Conventionally, there has been known an image forming apparatus provided with a plurality of units classified according to functions thereof (see Japanese Laid-Open Patent Publication (Kokai) No. H08-297436).

FIG. 17 is a block diagram showing the construction of a control system in a conventional image forming apparatus.

The present image forming apparatus is provided with an operating unit 1701, a drum motor unit 1708, a charging unit 1702, an exposure/optical unit 1703, a development unit 1704, a transfer unit 1705, a cleaning unit 1706, bank units 1707-1 to 1707-4, a conveyance unit 1709, and a fixing/discharging unit 1710. The units 1701 to 1710 are provided with the corresponding unit control panels 1701a to 1710a as well as various devices, sensors, motors and power sources. A plurality of unit control panels 1701a to 1710a are respectively provided with CPUs not shown, and interconnected via a communication line 1758. There is a communication line 1759 between the unit control panel 1703a and the communication line 1709a.

Each of the units 1701 to 1710 is composed as a controlled unit. The plurality of unit control panels 1701a to 1710a perform multiplex communication of signals via the communication line 1758 and ensure consistency of the controls among the unit control panels 1701a to 1710a, to control the corresponding units 1701 to 1710.

In the above-mentioned image forming apparatus, however, each unit control panel should be developed anew whenever a control object (load) or control specification is changed as a result of designing a new facility. Even if change in design specification is small, it is only possible to divert a part of an existing unit control panel. As a result, such an image forming apparatus is high in development cost, or takes a long time to develop, and is therefore low in development efficiency.

SUMMARY OF THE INVENTION

It is an object of the present invention to provide a control apparatus used in an image forming apparatus, a control method therefor, and an image forming apparatus which are capable of improving development efficiency and decreasing development cost as well.

To attain the above object, in a first aspect of the present invention, there is provided a control apparatus used in an image forming apparatus capable of equipping a plurality of units each of which is classified according to a function thereof and constituted as a controlled unit, the control apparatus comprising at least one relay device comprising a plurality of interfaces that are connectable with the plurality of units, the plurality of interfaces having common standards, a detection section that detects each connection state of the plurality of units to the plurality of interfaces, a decision section that decides self-identification information for the relay device according to the connection state detected by the detection section, a consistency control section that performs consistency control to secure consistency of control between the plurality of units connected to the interfaces, based on the self-identification information for the relay device decided by the decision section, and a control device that is communicatably connected to the relay device, the control device obtaining the self-identification information for the relay device decided by the decision section from the relay device, and performing control according to the obtained self-identification information for the relay device.

With the arrangement of the first aspect of the present invention, each connection state of the plurality of units can be automatically detected, and the consistency control to secure consistency of control between the plurality of units can be performed according to the detected connection state. Further, each of the plurality of units which is classified according to a function thereof in the relay board and constituted as a controlled unit is connectable with any of a plurality of I/Fs with common standards in the relay board. Therefore, the development or diversion of the units become easier. As a result, the efficiency of development is improved, and the total development cost can be decreased.

Preferably, the plurality of units are preliminarily provided each with uniquely identifiable unit identification information, the detection section detects each connection state of the plurality of units to the plurality of interfaces by obtaining each unit identification information of the plurality units connected to the plurality of interfaces via the plurality of interfaces, and the decision section decides the self-identification information for the relay device according to the connection state detected by the detection section, based on a combination of the obtained unit identification information.

Preferably, the rely device performs the consistency control between the plurality of units connected to the plurality of interfaces according to the control by the control device corresponding to the decided self-identification information for the relay device, based on the self-identification information for the relay device decide by the decision section.

Preferably, the control apparatus is connected with a warning section for giving a warning to a user, the control device determines whether the self-identification information for the relay device decided by the relay device is self-identification information for a controllable relay device, and when it is determined that the self-identification information for the relay device is self-identification information for a noncontrollable relay device, the control section controls the warning section to give a warning indicative of that effect.

To attain the above object, in a second aspect of the present invention, there is provided an image forming apparatus having a control apparatus according to the first aspect of the present invention, and capable of equipping a plurality of units each of which is classified according to a function thereof and constituted as a controlled unit.

To attain the above object, in a third aspect of the present invention, there is provided a control method for controlling a plurality of units and being executed by a control apparatus used in an image forming apparatus capable of equipping the plurality of units each of which is classified according to a function thereof and constituted as a controlled unit, the control apparatus being provided with a relay device having a plurality of interfaces that are connectable with the plurality of units, and a control device that is communicatably connected to the relay device, the plurality of interfaces having common standards, the control method comprising a detection step of detecting each connection state of the plurality of units to the plurality of interfaces, a decision step of deciding self-identification information for the relay device according to the connection state detected in the detection step, a consistency control step of performing consistency control to secure consistency of control between the plurality of units connected to the interfaces, based on the self-identification information for the relay device decided in the decision step, and a control step of obtaining the self-identification information for the relay device decided in the decision step from the relay device, and performing control according to the obtained self-identification information for the relay device.

The above and other objects, features, and advantages of the invention will become more apparent from the following detailed description taken in conjunction with the accompanying drawings.

BRIEF DESCRIPTION OF THE DRAWINGS

FIG. 14 is a diagram showing a connection relation table which is used in deciding an ID of the relay board 300 in response to the connection state of the driver boards 5001 to 5004 connected to the relay board 300.

DETAILED DESCRIPTION OF THE PREFERRED EMBODIMENTS

The present invention will now be described in detail with reference to the drawings showing a preferred embodiment thereof.

Figure 1:
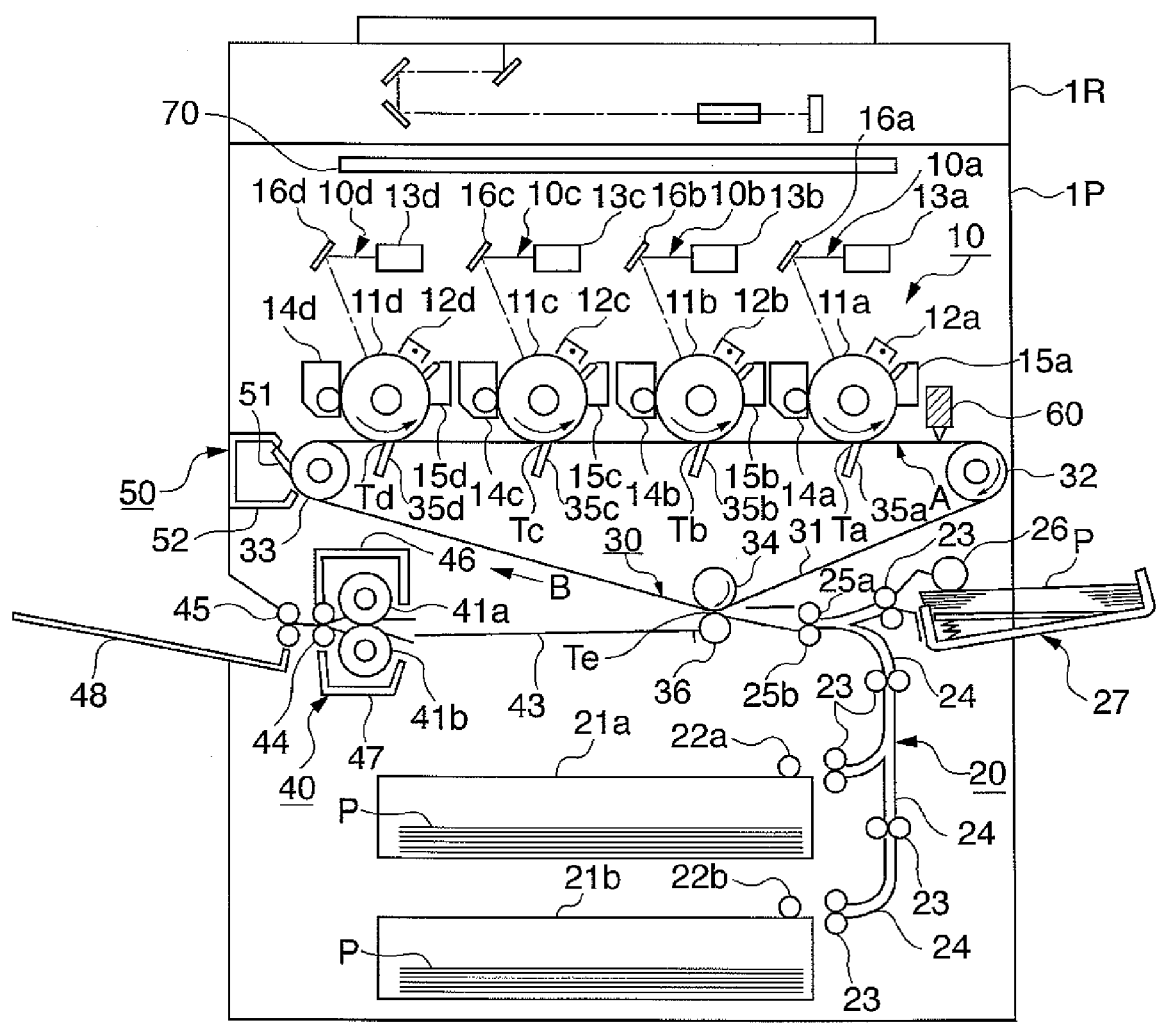
FIG. 1 is a longitudinal sectional view showing the construction of an image forming apparatus incorporating a control apparatus according to an embodiment of the present invention.
Figure 2:
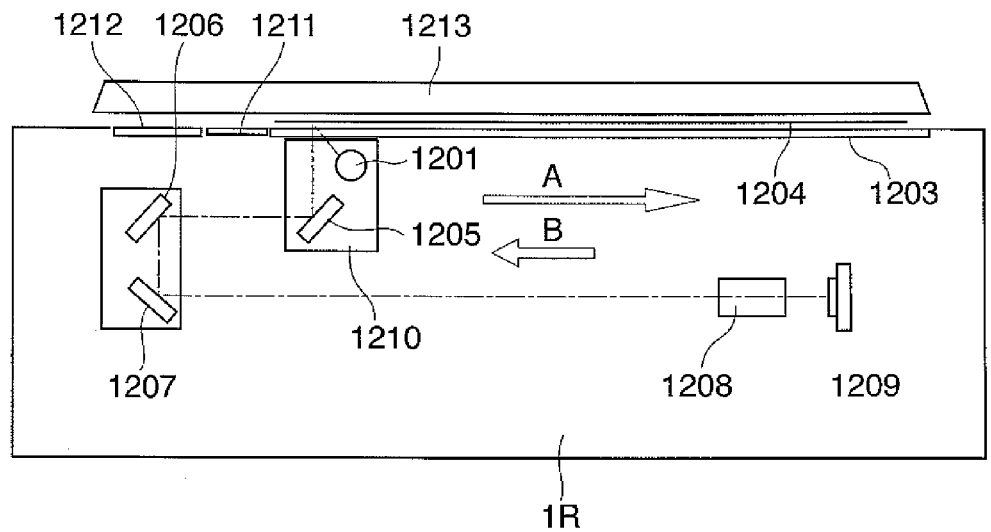
FIG. 2 is a longitudinal sectional view schematically showing the construction of a reader adopting a stationary original reading method.
Figure 3:
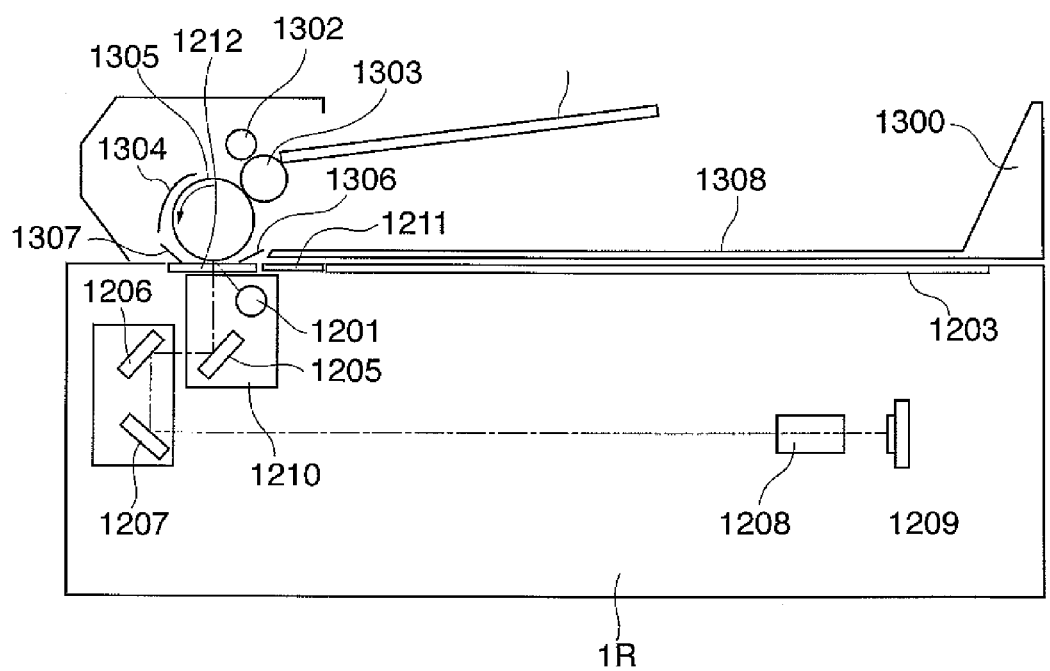
FIG. 3 is a longitudinal sectional view schematically showing the construction of a reader to which an ADF (Automatic Document Feeder) is attached.
Figure 4A:
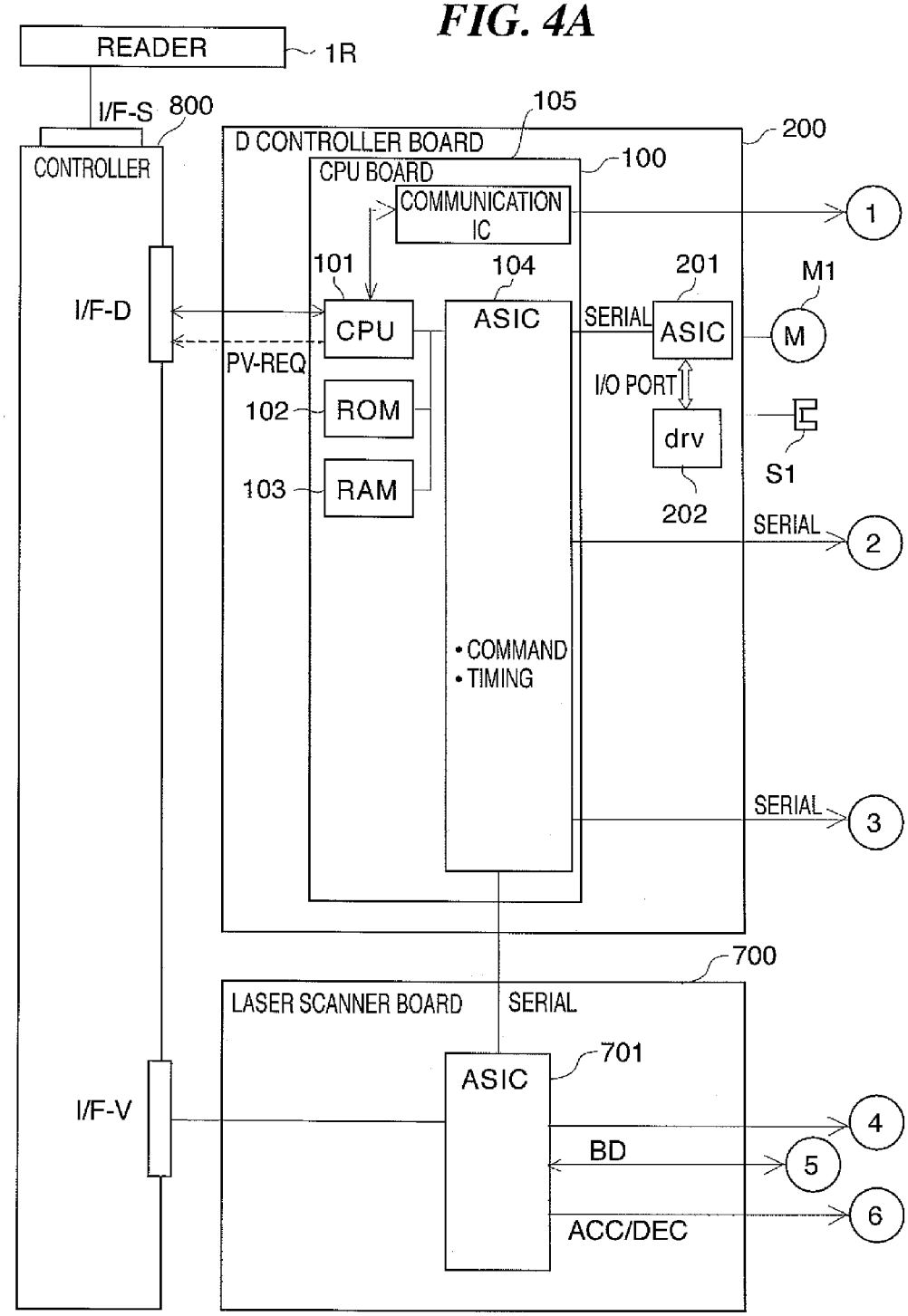
FIGS. 4A and 4B are block diagrams showing the configuration of a control apparatus incorporated in the image forming apparatus of the FIG. 1.
Figure 4B:
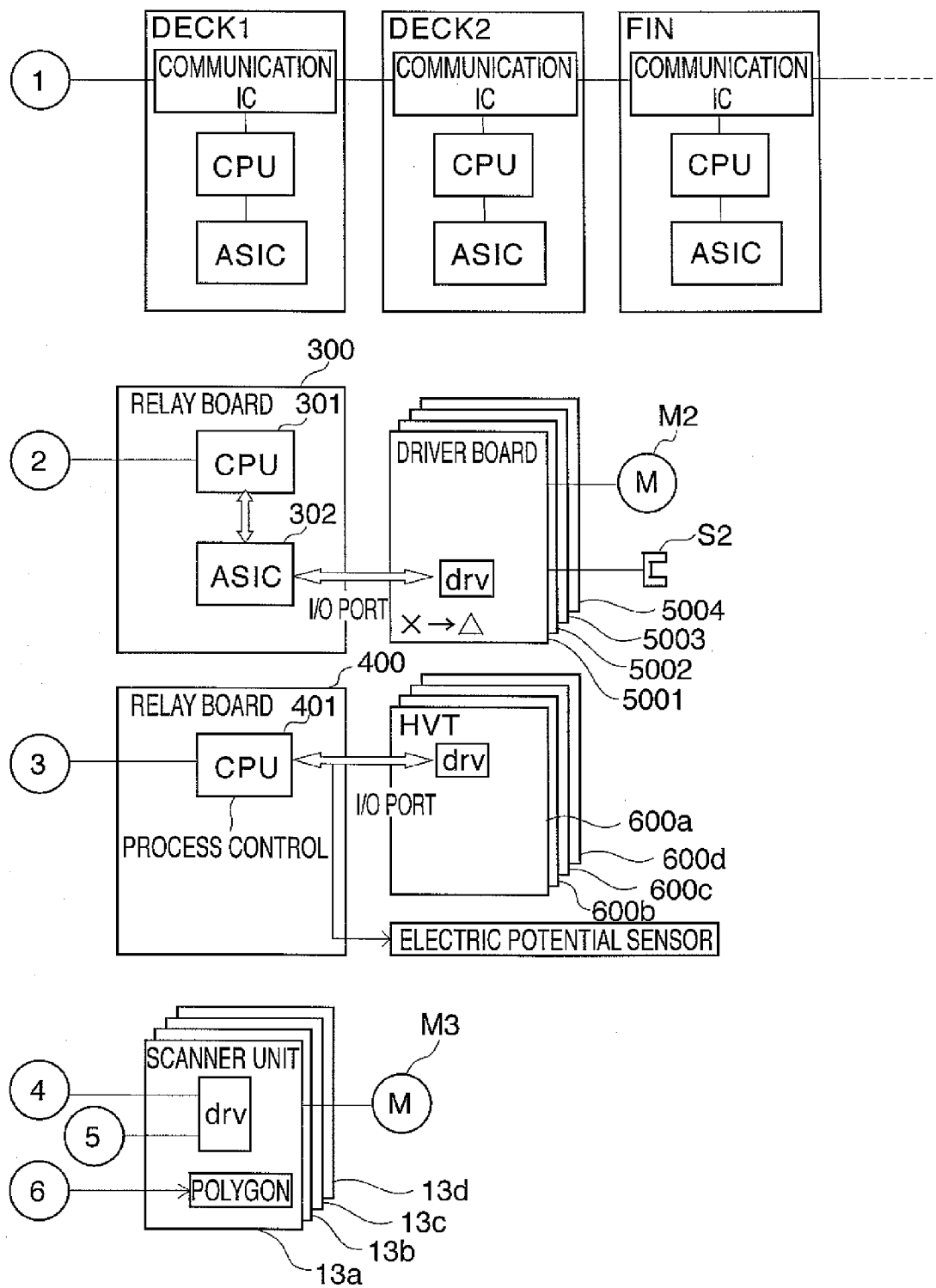

FIG. 1 is a longitudinal sectional view showing the construction of an image forming apparatus incorporating a control apparatus according to an embodiment of the present invention. FIG. 2 is a longitudinal sectional view schematically showing the construction of a reader adopting a stationary original reading method. FIG. 3 is a longitudinal sectional view schematically showing the construction of a reader to which an ADF (Automatic Document Feeder) is attached. FIGS. 4A and 4B are block diagrams showing the configuration of a control apparatus incorporated in the image forming apparatus of the FIG. 1.

The image forming apparatus is a color copier provided with a reader 1R and a printer 1P, as shown in FIG. 1. The reader 1R is an image reader. The printer 1P is a printer which forms a color image read with the reader 1R on a transfer material P in an intermediate transfer method.

An image reader provided with the construction shown in FIG. 2 or 3 is used as the reader 1R. First, the reader 1R as an image reader adopting the stationary original reading method will be described hereunder.

The reader 1R is provided with an original illuminating lamp to illuminate an original 1204 placed on a platen glass 1203, and a plurality of mirrors 1205, 1206 and 1207 to guide the reflected light from the lighted original 1204 to lens 1208. Light passed through the lens 1208 forms its image on the color CCD 1209, and the color CCD 1209 converts the formed optical image into an electric signal to output.

An original-illuminating lamp 1201 and the mirror 1205 are mounted on the reader 1210, and the reader 1210 is constructed in such a manner as to be reciprocable in directions indicated by an arrow A or an arrow B. When the reader 1210 moves in the direction A or the direction B, the mirrors 1206 and 1207 move in unison in the direction A or B so that the distance between an original surface and the color CCD 1209 (i.e., optical path length) is kept constant.

Provided at the front position of the platen glass 1203 are a shading correcting board 1211 and an original-through reading position window 1212. A pressing plate 1213 for pressing an original placed on the platen glass 1203 is provided over the platen glass 1203.

When an original is read by the image reader 1R, an operator first opens the pressing plate 1213 and places the original on the platen glass 1203. The operator then closes the pressing plate 1213 and presses a start key indicative of the start of copying. This causes the image reader 1R to start its reading operation. In the reading operation, the reader 1210 first moves in the direction B from its home position and stops at a position for reading the shading correcting board 1211.

Next, the original-illuminating lamp 1201 is lit to illuminate the shading correcting board 1211. The reflected light from the shading correcting board 1211 is guided via the mirrors 1205, 1206 and 1207, and the lens 1208 to the color CCD 1209, so that the color CCD 1209 reads the shading correcting board 1211. Based on the output of the color CCD 1209 resulting from this reading, a shading correction is performed. This shading correction corrects variations in the illumination of the original-illuminating lamp 1201, a light fall-off at the edges of the lens 1208, and pixel by pixel variations in the sensitivity of the color CCD 1209. Thus, unevenness in reading the original image is corrected.

On completion of the shading correction, the reader 1210 further moves in the direction B and stops at the position just under the original-through reading window 1212. This position is a reading start position for an original image, from which the reader 1210 moves in the direction A with gradually increasing speed. On reaching a position corresponding to the leading end of the original 1204 on the platen glass 1203, the reader 1210 moves from the position at a predetermined constant speed. While the reader 1210 is moving at the constant speed, the color CCD 1209 captures the reflected light from the original 1204 to read the image on the original 1204. The color CCD 1209 converts the formed optical image into electrical signal to output. This electrical signal is converted into an image signal, to which a predetermined image processing is performed. The processed image signal is outputted to the printer 1P.

When the reader 1210 reaches a position corresponding to the trailing end of the original 1204, the reader 1210 stops at the position and then moves in the direction B to its home position. The reader 1210 waits at the home position ready for reading the next original 1204.

The ADF can be mounted on the reader 1R in FIG. 2. In this case, an ADF 1300 is mounted on the image reader 1R in FIG. 2 instead of the pressing plate 1213, as shown in FIG. 3. The ADF 1300 has an original stacking tray 1301 stacking originals. The originals stacked on the stacking tray 1301 are fed one by one by the paper feed rollers 1302 and 1303. Each original fed via the paper feed rollers 1302 and 1303 is conveyed by a conveying roller 1305 through an original-through reading position (i.e., the position just over the original-through reading window 1212) with a guide of guides 1304, 1307, and 1306. The original is discharged on a discharge tray 1308.

When a plurality of originals are read on the image reader 1R, the originals are put on the original stacking tray 1301 in the ADF 1300 and the start key is pressed. Once the reading operation starts, the correcting board 1211 is first read as described above to perform the shading correction. After the shading correction, the reader 1210 moves to the above-mentioned original-through reading position and stops.

The ADF 1300 then starts feeding the originals. The fed originals pass through the original-through reading position and is discharged on the discharge tray 1308. When each original passes through the original-through reading position, the reflected light from the original is guided via the mirrors 1205, 1206, and 1207 and the lens 1208 to the color CCD 1209, and the color CCD 1209 converts the formed optical image into an electrical signal to output. This electrical signal is converted into an image signal, to which a predetermined image processing is performed. The processed image signal is outputted to the printer 1P.

Specifically, the printer 1P has an image forming section 10 including four stations 10a, 10b, 10c, and 10d, a paper feed unit 20, an intermediate transfer unit 30, a fixing unit 40, and a control section 70. The stations 10a to 10d in the image forming section 10 include a plurality of photosensitive drums 11a to 11d respectively, which are driven to rotate in the directions of the arrows shown in FIG. 1. The photosensitive drums 11a to 11d are drums for corresponding colors (cyan, magenta, yellow, and black) respectively. Placed around the photosensitive drums 11a to 11d are primary electrostatic chargers 12a to 12d, scanner units 13a to 13d, reflecting mirrors 16a to 16d, developing devices 14a to 14d, and cleaners 15a to 15d, respectively. The primary electrostatic chargers 12a to 12d are chargers for electrifying the surfaces of the corresponding photosensitive drums 11a to 11d at a predetermined potential. The scanner units 13a to 13d are devices for modulating laser beams based on input image signals, and exposing and scanning the surfaces of the corresponding photosensitive drums 11a to 11d with the modulated laser beams via the reflecting mirrors 16a to 16d. The exposure and scanning forms electrostatic latent images on the photosensitive drums 11a to 11d according to the image signals. The developing devices 14a to 14d are developing devices for supplying toner of corresponding colors onto the corresponding photosensitive drums 11a to 11d and providing visible toner images corresponding to the electrostatic latent images formed on the corresponding photosensitive drums 11a to 11d. The cleaners 15a to 15d are devices for recovering the remaining toner on the corresponding photosensitive drums 11a to 11d.

The intermediate transfer unit 30 includes an intermediate transfer belt 31 on which the toner images formed on the photosensitive drums 11a to 11d are sequentially transferred in layers in primary transfer areas Ta, Tb, Tc, Td, respectively. The intermediate transfer belt 31 winds around a driving roller 32, a follower roller 33, and secondary transfer counter roller 34 that is opposed to a secondary transfer position Te across the intermediate transfer belt 31.

Electrostatic chargers 35a to 35d for primary transfer are provided at the positions opposed to the primary transfer areas Ta, Tb, Tc, and Td across the intermediate transfer belt 31. A secondary transfer roller 36 is provided at the position opposed to the secondary transfer counter roller 34 across the intermediate transfer belt 31, so that the secondary transfer area Te is provided by a nip formed between the secondary transfer roller 36 and the intermediate transfer belt 31. The secondary transfer roller 36 is pressed against the intermediate transfer belt 31 at an appropriate pressure. A cleaning blade 51 for cleaning the image forming surface of the intermediate transfer belt 31, and a waste toner box 52 for receiving waste toner are provided downstream from the secondary transfer area Te.

The paper feed unit 20 includes cassettes 21a, 21b and a manual feed tray 27 for containing transfer materials P. The cassettes 21a and 21b and the manual feed tray 27 are provided with pickup rollers 22a, 22b, and 26 for feeding the transfer materials P one by one, respectively. Each of transfer materials P sent from the cassette 21a, 21b, and the manual feed tray 27 by the respective pickup rollers 22a, 22b, and 26 is conveyed to registration rollers 25a and 25b by a pair of paper feed rollers 23 and a paper feed guide 24, and temporarily stops at the registration rollers 25a and 25b. The stopped transfer material P is sent by the registration rollers 25a and 25b to the second transfer area Te in timing synchronous with the image forming of the image forming section 10. In the secondary transfer area Te, the toner image (full-color toner image) transferred onto the intermediate transfer belt 31 is transferred onto the transfer material P. The transfer material P that has come out of the secondary transfer area Te is sent to the fixing unit 40 guided along a guide 43.

The fixing unit 40 includes a fixing roller 41a and a pressing roller 41b. A nip portion is formed between the fixing roller 41a and the pressing roller 41b for nipping and conveying the transfer material P. When the transfer material P guided and sent along the guide 43 passes through the nip portion, the toner image on the transfer material P is subjected to a thermal pressure and fixed on the transfer material P. The transfer material P that has passed through the nip portion is discharged outside the printer 1P via an internal discharge roller 44 and an external discharge roller 45.

In this type of the image forming apparatus using the intermediate transfer method, an error in mechanical attachment between the photosensitive drums 11a to 11d, a difference in the optical path length of the laser beams generated by the scanner units 13a to 13d, a deviation of the optical path, warpage due to the ambient temperature of the LED, and so forth are sometimes caused. Due to the error, difference, deviation, warpage, and so forth, misalignment in registration, i.e., what is called color misalignment (misregistration) may occur in the color toner images formed on the photosensitive drums 11a to 11d. To correct this misregistration, a registration sensor 60 that detects the misregistration is provided at a location downstream of all the stations 10a to 10d of the image forming section 10 and immediately upstream of a turning part of the intermediate transfer belt 31 where the intermediate transfer belt 31 is wound over the drive roller 32.

As shown in FIG. 4A, a control section 70 has a controller 800 for controlling the entire image forming apparatus. The controller 800 is provided with a plurality of interfaces I/F-S, I/F-D, I/F-V. The interface I/F-S is connected with the image reading apparatus 1R, the interface I/F-D is connected with a DC controller board 200, and the interface I/F-V is connected with a laser scanner board 700, respectively. The DC controller board 200 is a controller for controlling the printer 1P and includes a CPU board 100 corresponding to a specific unit, an ASIC 201, and a driver (drv) 202.

The CPU board 100 is provided with a CPU 101, a ROM 102, a RAM 103, an ASIC 104, and a communication IC 105. The CPU 101 executes a program stored on the ROM 102 by using the RAM 103 as a work area. According to the program, the CPU 101 generates control commands and so forth for controlling the image forming section 10, the paper feed unit 20, the intermediate transfer unit 30, and optional devices to be equipped when necessary.

The above-mentioned optional devices are paper feed decks DECK 1, DECK 2, and a finisher FIN and so forth. A corresponding one of the generated control commands is provided to each of devices such as paper feed decks DECK 1, DECK 2 and a finisher FIN via the communication IC 105.

A corresponding control command is also provided to the driver 202 via the ASIC 104 and the ASIC 201. The driver 202 drives a motor M1 based on the provided control command while monitoring output of a sensor S1. Serial communication is performed between the ASIC 104 and the ASIC 201.

A corresponding control command is also provided to the relay board 300 via the ASIC 104. The relay board 300 has a CPU 301 and an ASIC 302. Based on the provided control command, the CPU 301 generates control signals and so forth for driving a plurality of motors, respectively. Each of the control signals generated by the CPU 301 is input to corresponding driver boards 5001 to 5004 via the ASIC 302. For example, based on the input control signal, the driver board 5001 drives a motor M2 while monitoring output of a sensor S2.

A corresponding control command is also provided to the relay board 400 via the ASIC 104. The relay board 400 has a CPU 401. The CPU 401 generates control signals for operating a plurality of high voltage generators respectively while monitoring output of corresponding sensors, for example a potential sensor. Each of the control signals generated by the CPU 401 is input to the corresponding high voltage generators 600a to 600d, which operate based on the input control signals.

A corresponding control command is also provided to a laser scanner board 700 via the ASIC 104. The laser scanner board 700 has an ASIC 701. An image signal read by the image reader 1R is input to the ASIC 701 via the controller 800. The ASIC 701 generates driving signals for the scanner units 13a to 13d based on the control command from the ASIC 104 and the input image signal while monitoring BD signals input from the scanner units 13a to 13d. The driving signals for the scanner units 13a to 13d are input to the scanner units 13a to 13d, respectively. The scanner units 13a to 13d emit laser beams based on the driving signals and drive a driving motor M3 for polygon mirrors so that the laser beams perform exposure and scanning of the corresponding photosensitive drums 11a to 11d.

The CPU 101 and the ASIC 104 are connected via a system bus, and the ASIC 104 has a function of expansion IC. The ASIC 104 first performs serial communication with the relay boards 300 and 400, and the laser scanner board 700 which are connected to the DC controller board 200, and recognizes an ID (type) of the connected relay board or laser scanner board. When ASIC 104 recognizes the ID (type) of the connected relay board or laser scanner board, it reports to the CPU 101 the number and ID of the relay boards connected to the DC controller board 200 as well as the ID of the laser scanner board.

According to the reported information, the CPU 101 performs fine adjustment of parameters such as control timing to respective relay boards 300 and 400, and the laser scanner board 700 so that the optional devices, the driver boards 5001 to 5004, the high voltage generators 600a to 600d, the scanner units 13a to 13d, and so forth can perform optimal control.

When the optional devices, the driver boards 5001 to 5004, the high voltage generators 600a to 600d, the scanner units 13a to 13d, and so forth are driven, the ASIC 104 inputs the control command from the CPU 101, and outputs the same to the relay boards 300 and 400, and the laser scanner board 700.

Figure 5:
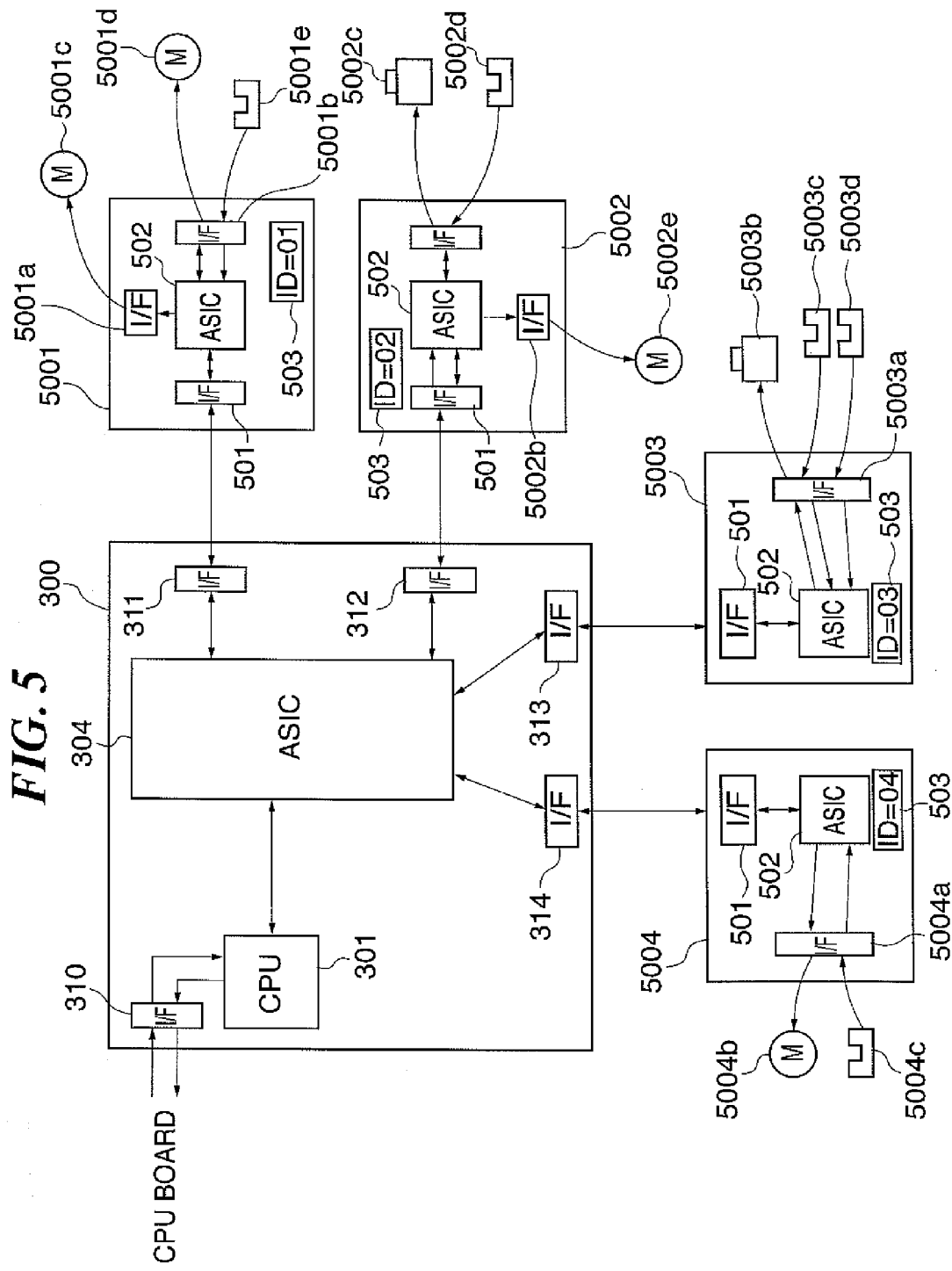
FIG. 5 is a block diagram showing the configurations of a relay board 300 and driver boards 5001 to 5004 in FIG. 4B.

Now, the relay board 300 will be described with reference to FIG. 5. FIG. 5 is a block diagram showing the configuration of the relay board 300 in FIG. 4B.

In FIG. 5, the relay board 300 is provided with the CPU 301, ASIC 302, and a plurality of I/Fs 310 to 314. The relay board 300 is a unit for carrying out conversions of signals inputted or outputted between the interfaces on the driver boards 5001 to 5004 and the interfaces on the CPU board 100, and for performing fine control according to the characteristics of the driver boards 5001 to 5004.

An I/F 310 in the relay board 300 is a serial method interface for connection with the CPU 100. The I/Fs 311 to 314 are interfaces for connection with the corresponding driver boards 5001 to 5004, respectively. A plurality of I/Fs 310 to 314 have common standards.

The ASIC 302 is connected with the CPU 301 via the system bus, and the ASIC 104 has a function of expansion IC. Specifically, the ASIC 302 first performs serial communication with the driver boards 5001 to 5004 connected with the serial board 300, and recognizes the IDs (type) of the connected driver boards. When the ASIC 104 recognizes the IDs of the connected driver boards 5001 to 5004, the ASIC 302 reports the number and IDs of the driver boards 5001 to 5004 to the CPU 301. The CPU 301 performs fine adjustment of parameters such as control timing on the respective driver boards 5001 to 5004 so that motors such as the motor M2 can perform optimal control. ASIC 302 receives the control command from the CPU 301, control the driver ICs (not shown) mounted on the driver boards 5001 to 5004, and rotatively drives the motors such as the M2 connected to the respective driver ICs.

The driver board 5001 is a driver for driving the motors of a paper feed system for feeding papers. The driver board 5001 has an ASIC 502, a plurality of I/Fs 501, 5001a, 5001b, and ID maintaining section 503. Via the I/F 501, the ASIC 502 inputs control signals from the relay board 300, outputs a sensor 5001e connected to the I/F 5001b, and outputs an ID maintained in the ID maintaining section 503 to the relay board 300. According to the input control signals, the ASIC 502 drives corresponding motors 5001c and 5001d.

The driver board 5002 is a driver for driving the driving motors of a conveying system for conveying papers, and has the same configuration as the driver board 5001. The driver board 5003 is a driver for driving the driving motors of a double-sided conveying system for carrying papers via a double-sided path, and has the same configuration as the driver board 5001. The driver board 5004 is a driver for driving the driving motors of a discharging system for discharging papers, and has the same configuration as the driver board 5001. Since a plurality of I/Es 310 to 314 have common standards, each of the I/F 501 in the driver boards 5001 to 5004 is capable of connecting to either of the I/Fs 310 to 314.

Figure 6:
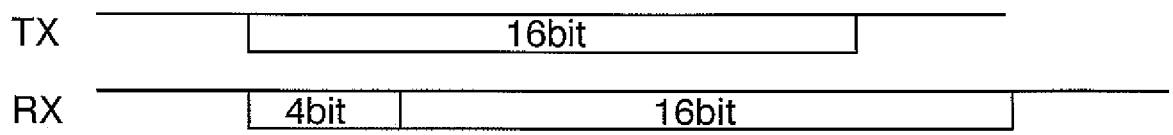
FIG. 6 is a diagram showing signals exchanged between the driver board 5001 and the relay board 300.
Figure 7:
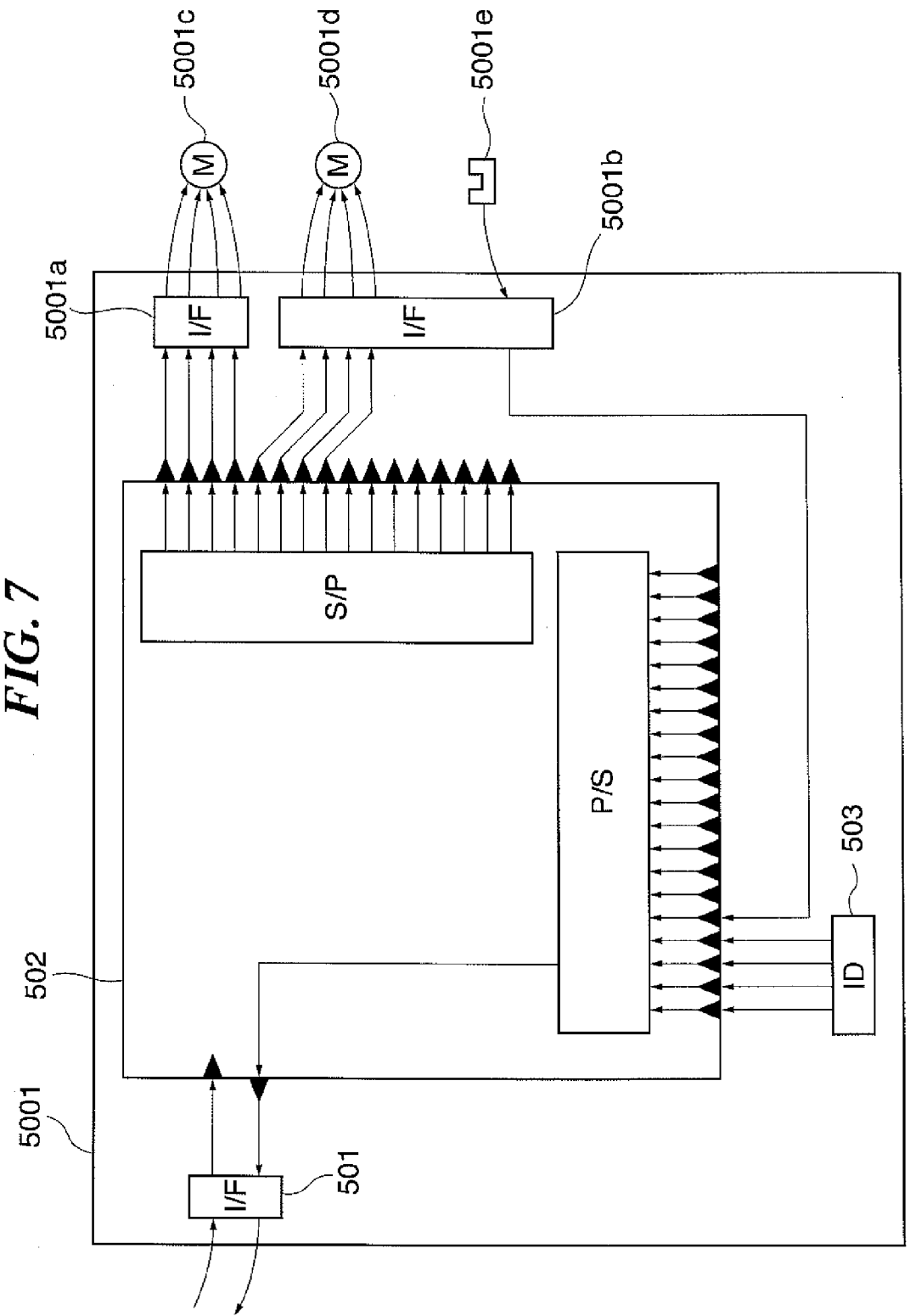
FIG. 7 is a diagram schematically showing the conversion state of signals Rx and Tx in FIG. 5.
Figure 8:
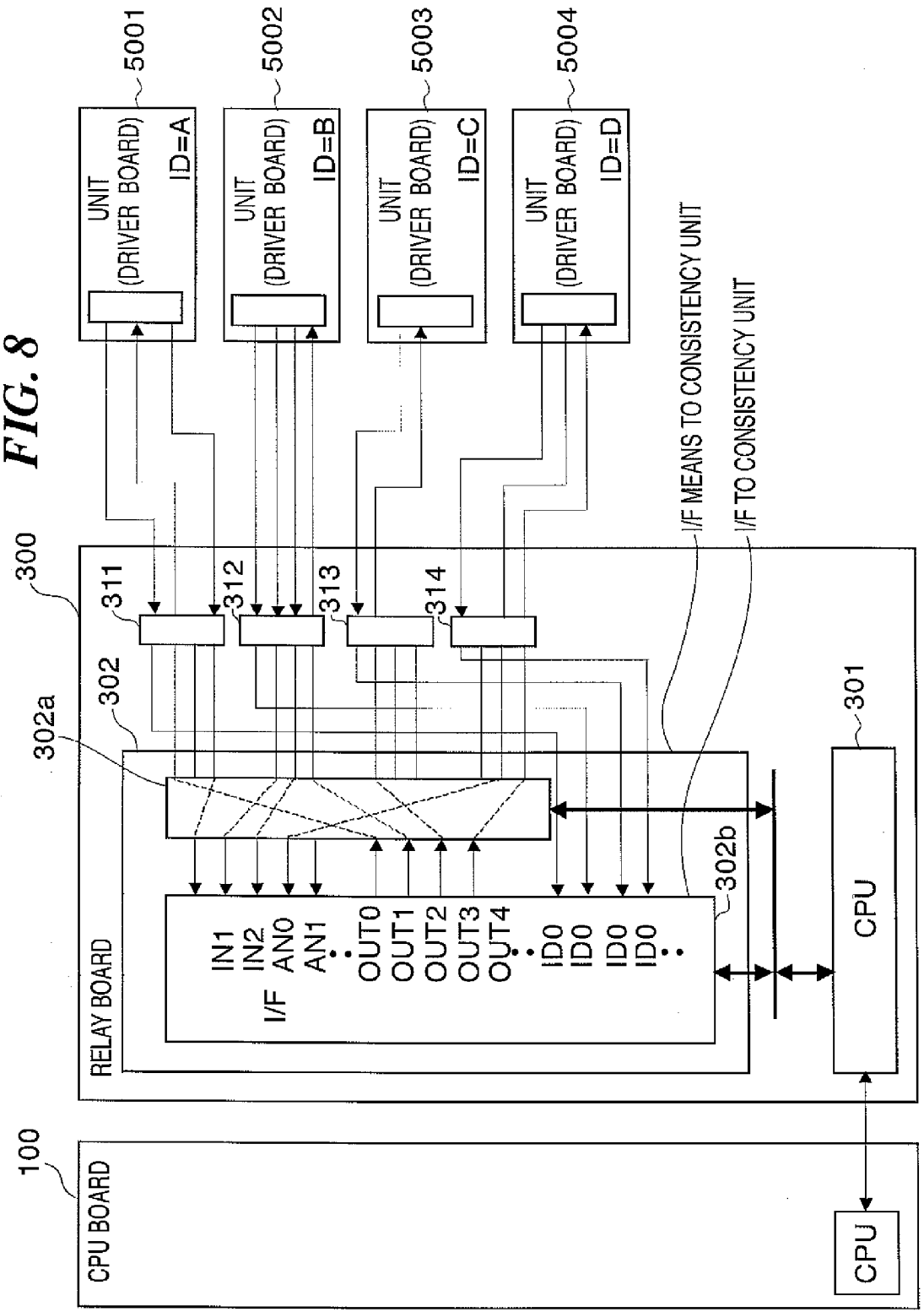
FIG. 8 is a block diagram showing the configuration of interfaces in the relay board 300 to the driver boards 5001 to 5004 in FIG. 5.

Now, signals exchanged between the driver board 5001 and the relay board 300 are described with reference to FIGS. 6 to 8. FIG. 6 is a diagram showing signals exchanged between the driver board 5001 and the relay board 300 in FIG. 5. FIG. 7 is a diagram schematically showing conversion of the signals Rx and Tx in FIG. 6. FIG. 8 is a block diagram showing the configuration of interfaces in the relay board 300 to the driver boards 5001 to 5004 in FIG. 5.

Figure 10:
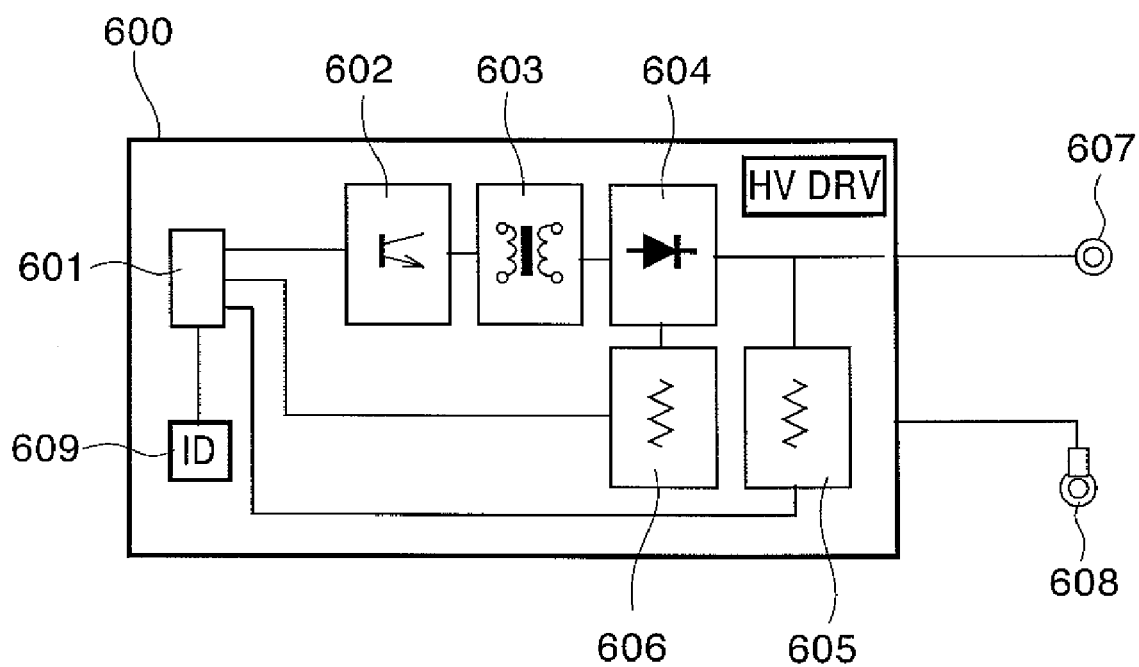
FIG. 10 is a block diagram showing the configuration of high voltage generators 600a to 600d in FIG. 4B.

In FIG. 10, the relay board 300 transmits a 16-bit serial signal Tx to the driver board 5001. The driver board 5001 transmits a 20-bit serial signal Rx to the relay board 300. In this signal Rx, the first four bits indicate the ID maintained in the ID maintaining section 503. Among the remaining bits, one bit indicates output of the sensor 5001e and another 15 bits are reserved.

Specifically, as shown in FIG. 8, the ASIC 302 of the relay board 300 has a parallel-serial/serial-parallel converter means 302b that performs parallel-serial conversion or serial-parallel conversion of input/output signals. The ASIC 302 also has a connection/modification means 302a that can programmably connect/modify the input/output signals.

On the driver substrate 5001, as shown in FIG. 7, the serial signal Tx received from the relay board 300 via the I/F 501 is input to the ASIC 502. The ASIC 502 converts the input serial signal Tx into a parallel signal, and corresponding four bits in the parallel signal are output to the motor 5001c via the I/F 500a. Other corresponding four bits in the parallel signal are output to the motor 5001d via the I/F 5001b.

The ASIC 502 receives output of the sensor 5001e via the I/F 5001b and receives the ID maintained in the ID maintaining section 503. These input signals are converted into the serial signal Rx, and the serial signal Rx is output from the ASIC 502 to the relay board 300 via the I/F 501.

Signals exchanged between the driver boards 5002 to 5004 and the relay board 300 will be omitted here because they are similar to those exchanged between the driver board 5001 and the relay board 300.

Next, how the relay board 300 drives the driver boards based on the command from the CPU board 100 will be described specifically.

Immediately after the electric power is turned on, the ID of the driver board 5001 is converted into serial signals at the ACIC 502, and transmitted to the relay board 300. Thereby, the relay board 300 can detect that the driver board 5001 connected to the I/F 311 is a driver board of the sheet feeding section. When another driver board is connected to the I/F 311, the driver board is recognized by the relay board 300 based on the ID in the same way. In this case, in order to be compatible with another driver board, the channel switching in communication is made in the ASIC 302, and the relay board 300 can perform control compatible with another driver board. Namely, I/Fs 311 to 314 in the relay board 300 are all common, any one of the driver boards 5001 to 5004 is connectable thereto. The I/D of the driver boards connected like this is recognized, and the control of respective I/Es is switched according to the recognized I/D.

What operations are made when the relay board 300 receives a command from the CPU board 100, for example, "to perform feeding" will be described here.

A control program which provides motors or the like connected to the driver board 5001 with proper driving signals at proper timing is stored in the CPU 301 of the relay board 300. The above driving signals are inputted to the ASIC 502 as serial signals from the I/F 311 via the I/F 501 in the driver board 5001. After the serial signals are converted into a parallel signal at the ASIC 502, the parallel signal is transmitted to a stepping motor 5001c via the I/F 5001a, and to a stepping motor 5001d via the I/F 5001b. A detection signal of a sensor 5001e for detecting a feeding operation is inputted to the ASIC 502 via the I/F 5001b. The ASIC 502 converts the detection signal of the sensor 5001e into a serial signal, which is transmitted to the relay board 300 via the I/F 501. Thereby, the timing of conveying sheets in the feeding operation is reported to the relay board 300.

In the present construction, for example, when the above stepping motor 5001c is replaced with another motor, adjustment is needed to optimize the driving system. For the adjustment to optimize the driving system, it is enough only to change a program stored in the CPU 301 of the relay board 300, and it does not influence the entire apparatus. Even though the above stepping motor 5001c is replaced with a DC motor, it is enough only to rewrite the programs of the hardware of the driver board 5001 and the CPU 301 in the relay board 300. In this case, the hardware of the relay board 300, and the CPU board 100 are not needed to be replaced. It is also true when the construction of the sheet feeding unit is changed and a sensor is added. Even though the construction of the device is changed and the driver board is added, it is enough only to add an I/F in the relay board 300 and change the program in the CPU 301. As a result, as for the CPU board 100, high versatility is obtained since there should be no need to change hardware and software.

Figure 9:
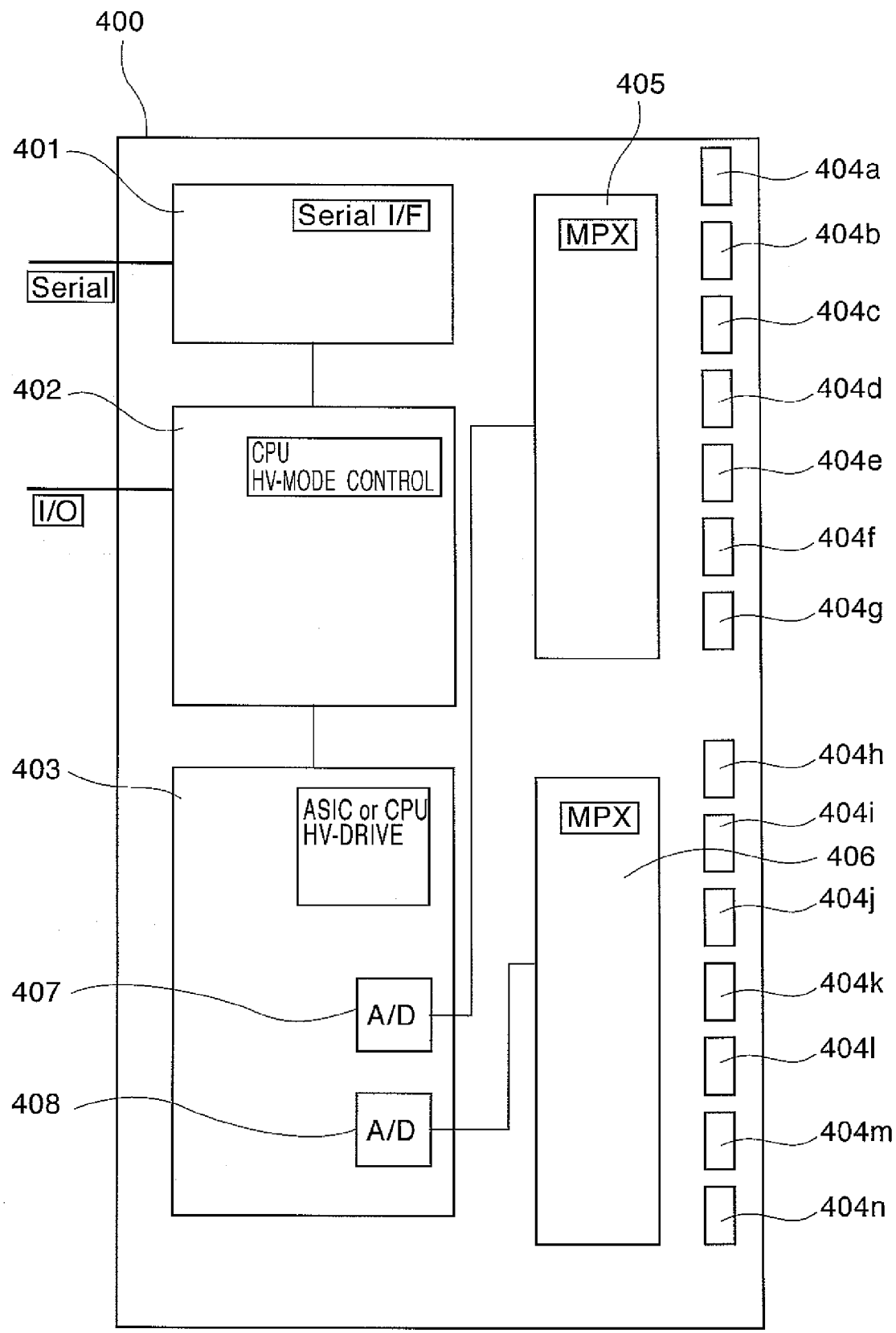
FIG. 9 is a block diagram showing the configuration of a relay board 400 in FIG. 4B.

Now, the relay board 400 and the high voltage generators 600a to 600d connected thereto will be described with reference to FIGS. 9 and 10. FIG. 9 is a block diagram showing the configuration of the relay board 400 in FIG. 4B. FIG. 10 is a block diagram showing the configuration of the high voltage generators 600a to 600d in FIG. 4.

As shown in FIG. 9, the relay board 400 has a serial I/F 401, a control section 402, a high voltage stabilization control section 403, a plurality of multiplexers 405 and 406, and a plurality of connectors 404a to 404n. The plurality of connectors 404a to 404n have common standards. The serial I/F 401 performs serial communication with the CPU board 100. The controller 402 receives commands from the CPU board 100 via the serial I/F 401 and sequentially controls the operation of the high voltage generators 600a to 600d. The high voltage stabilization control section 403 performs control for stabilizing output of the high voltage generators 600a to 600d in response to sequential instructions from the control section 402. The high voltage stabilization control section 403 is provided with A/D converters 407 and 408 corresponding to the multiplexers 405 and 406. The multiplexers 405 and 406 sort signals that are input or output via the corresponding connectors 404a to 404n.

Each of the high voltage generators 600a to 600d has the same configuration, and therefore the configuration of the high voltage generator 600a alone will be described below.

As shown in FIG. 10, the high voltage generator 600a has a connector 601 for connecting with the relay board 400, and a switch section 602 performing a switching operation based on an instruction from the relay board 400. According to the switching operation by the switch section 602, a transformer section 603 transforms and outputs the electric power. The output electric power is smoothed into a predetermined polarity and converted into a direct current voltage in a smoothing section 604. The direct current voltage is output via an output terminal 607. The value of the voltage converted into the direct current in the smoothing section 604 is detected by the voltage detecting section 606, and the detected voltage value is transmitted to the relay board 400 via the connector 601. The current value of the output voltage is also detected by a current detecting section 605, and the detected current value is transmitted to the relay board 400 via the connector 601. The high voltage generator 600 is grounded via a grounding terminal 608. The high voltage generator 600a is provided with the ID holding section 609 like the driver board 5001 and so forth. The holding section 609 outputs unique ID data to the relay board 400 via the connector 601. Since each of the plurality of connectors 404a to 404n has a common standard, each of the high voltage generators 600a to 600d can be connected to any one of the connectors 404a to 404n.

Figure 11:
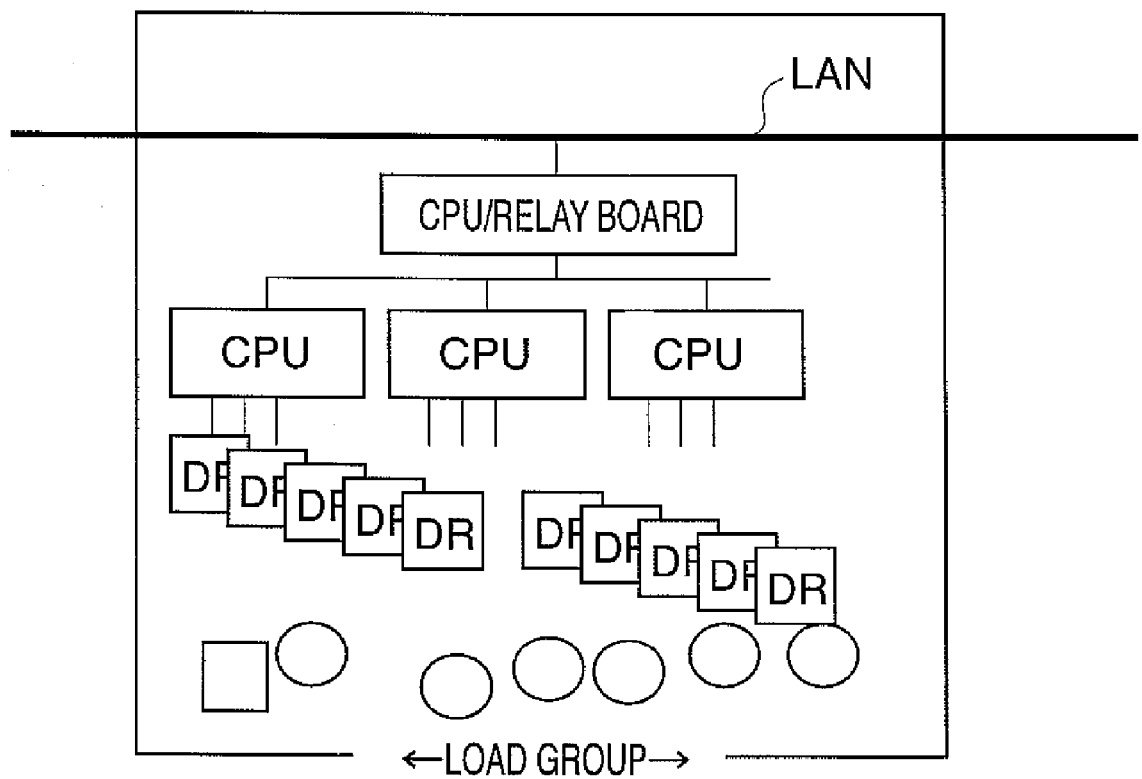
FIG. 11 is a diagram schematically showing an example of connection between the image forming apparatus and a paper feed deck.
Figure 12:
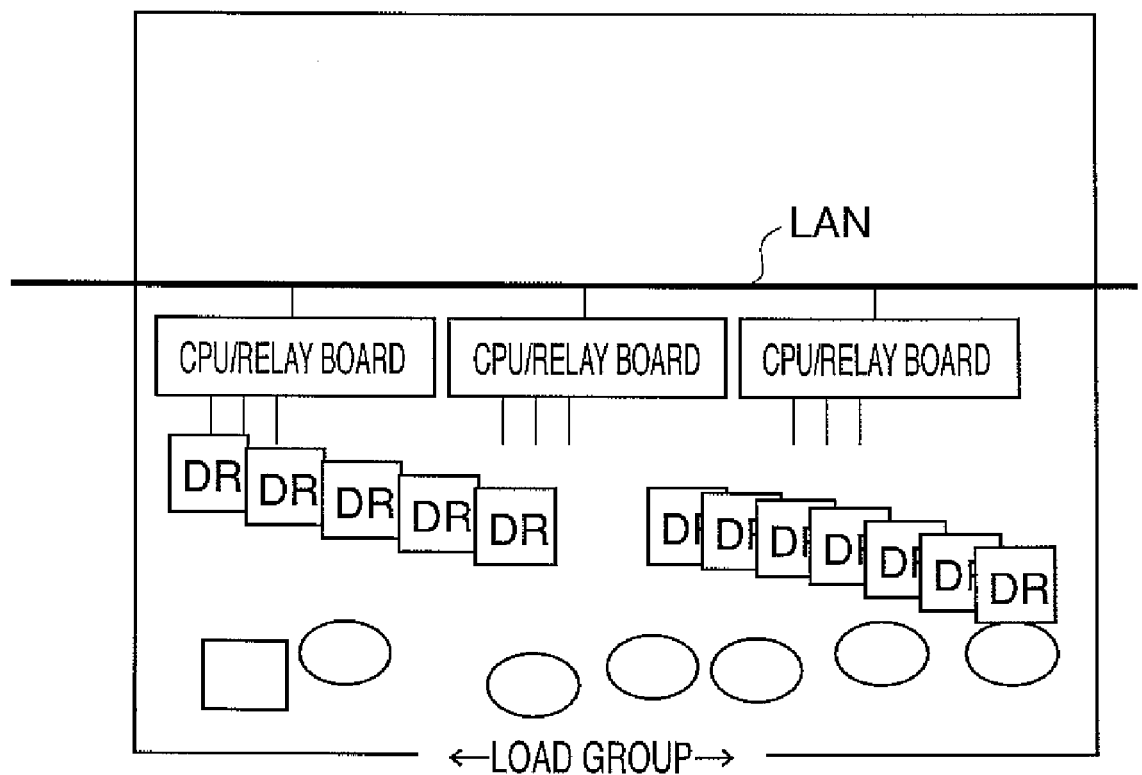
FIG. 12 a diagram schematically showing another example of connection between the image forming apparatus and the paper feed deck.
Figure 13:
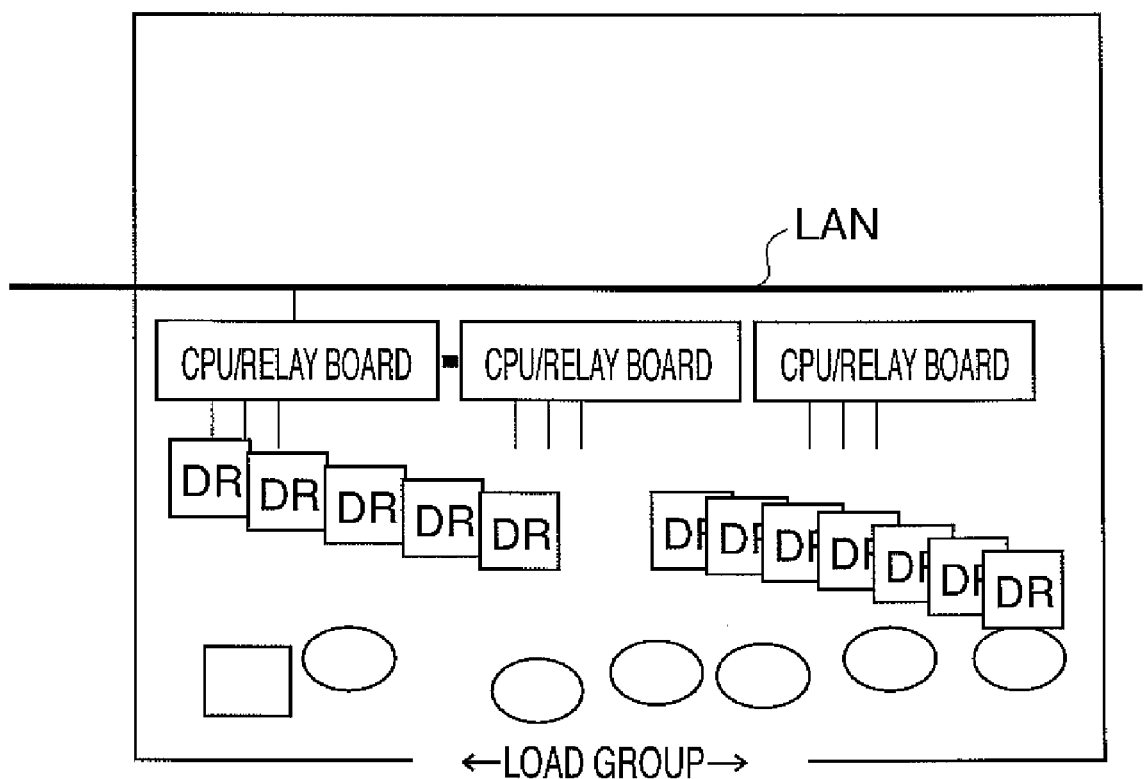
FIG. 13 is a diagram schematically showing still another example of connection between the image forming apparatus and the paper feed deck.

Now, the connection between the image forming apparatus and the paper feed deck will be described with reference to FIGS. 11 to 13. FIG. 11 is a diagram schematically showing an example of connection between the image forming apparatus and the paper feed deck. FIG. 12 is a diagram schematically showing another example of connection between the image forming apparatus and the paper feed deck. FIG. 13 is a diagram schematically showing still another example of connection between the image forming apparatus and the paper feed deck.

When the paper feed deck, for example, is connected to the image forming apparatus, the paper feed deck is connected via a LAN with the communication IC 105 on the CPU board 100. As shown in FIG. 11, the paper feed deck has a managing CPU/relay board connected to the LAN, and a plurality of paper feed units. Each of the paper feed units is provided with a CPU. The managing CPU/relay board is communicatively connected with the CPUs of the paper feed units. In this case, the CPU board 100 only needs to communicate with the managing CPU/relay board of the paper feed deck, which reduces a load on the paper feed deck imposed by the CPU board 100.

Alternatively, the paper feed deck may have the configuration shown in FIG. 12. In this case, the paper feed deck has a plurality of paper feed units, which have CPU/relay boards connected to the LAN, respectively. In this configuration, the CPU board 100 is communicated with each of the CPU/relay boards.

Alternatively, the paper feed deck may have the configuration shown in FIG. 13. In this case, the paper feed deck has a plurality of paper feed units. A paper feed unit is provided with a CPU/relay board. Another paper feed units are provided with CPU/relay boards. The CPU/relay boards are serially connected toward the downstream side so that the CPU/relay board in the above paper feed unit is the top.

Figure 15:
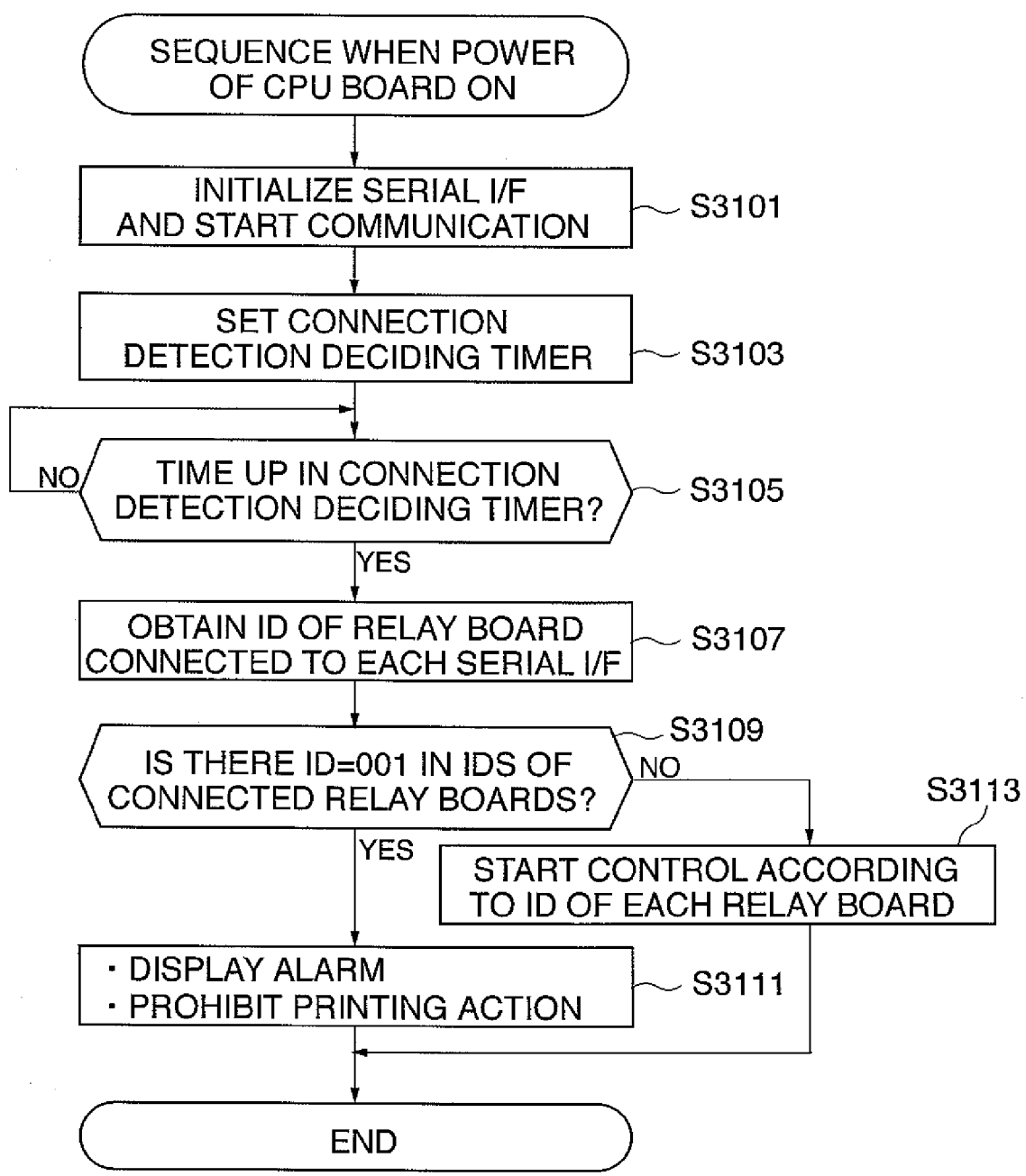
FIG. 15 is a flow chart showing a sequence when power is on in a CPU 100.
Figure 16:
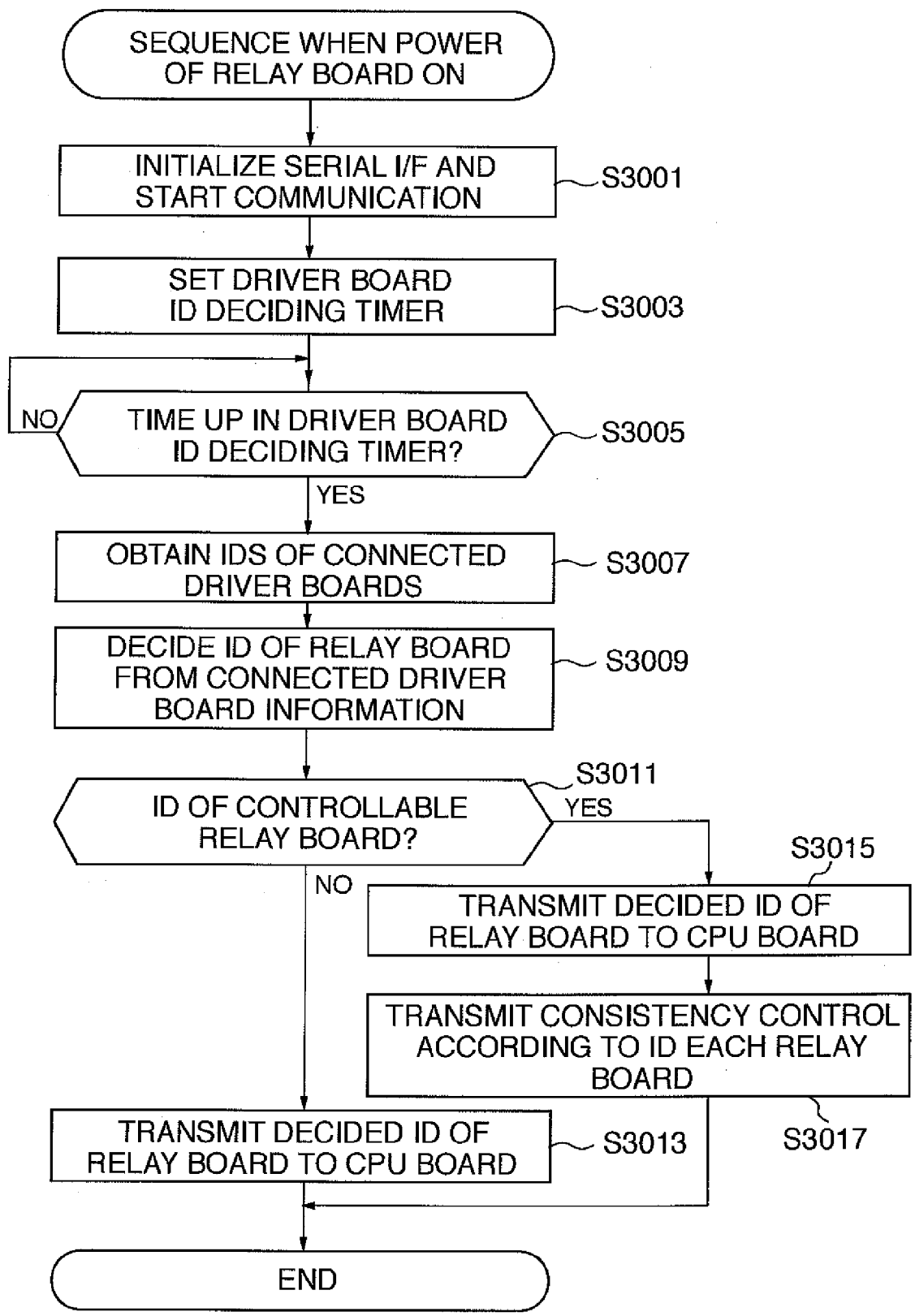
FIG. 16 is a flow chart showing a sequence when power is on in the relay board 300.
Figure 17:
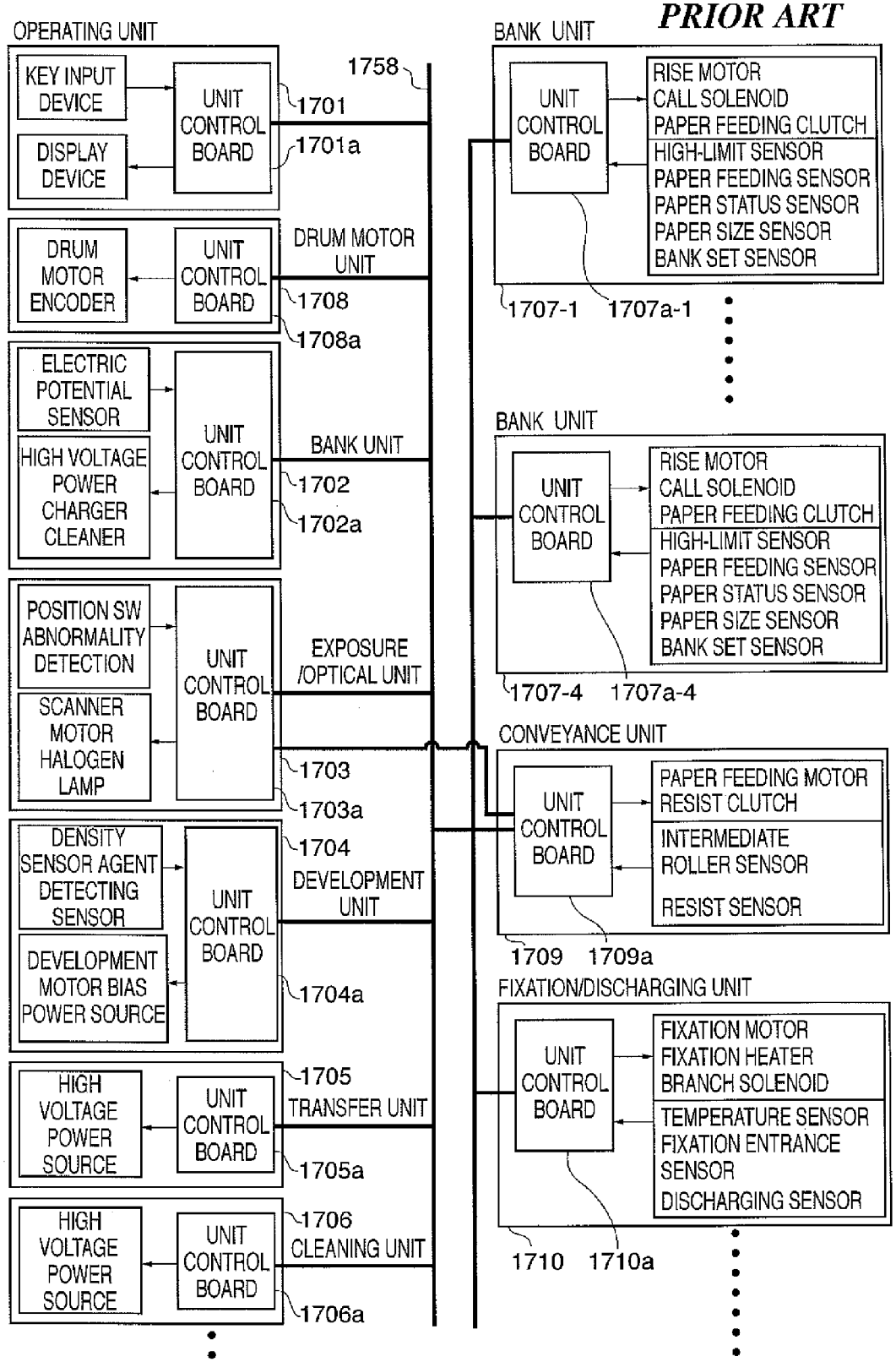
FIG. 17 a block diagram showing the configuration of a control system in a conventional image forming apparatus.

Now, the connection detection of the CPU board 100, relay board 300 and driver boards 5001 to 5004 will be described with reference to FIGS. 14 to 16. FIG. 14 is a diagram showing a connection relation table used in deciding an ID of the relay board 300 in response to connection state of the driver boards 5001 to 5004 connected to the relay board 300. FIG. 15 is a flow chart showing a sequence when the power of the relay board 100 is on. FIG. 16 is a flow chart showing a sequence when the power of the relay board 300 is on.

For example, for the relay board 300 to which each driver unit of ID="1", "2" is connected its ID becomes "100". For the relay board 300 to which each driver unit of ID="1", "2", "3" is connected its ID becomes "101". Thus, the ID of the relay board 300 is decided, and the relay board 300 performs consistency control of the corresponding driver unit.

When the relay board ID in the connection relation table decided by the combination of driver boards is not "100" to "401", the relay board ID becomes "001".

Now, the sequence will be described when the power of the CPU board 100 is on with reference to FIG. 15. The sequence shown in FIG. 15 is executed by the CPU 101 on the CPU board 100 according to the program stored in the ROM 102.

As shown in FIG. 15, when the power of the CPU board 100 is on, the serial I/F is initiated and the communication is started (Step S3101). Next, the CPU 101 sets a connection detection deciding timer in order to detect the connection of the relay boards 300, 400 or the like (Step S3103), and whether the time is up in the connection detection deciding timer is determined (Step S3105). Here, when the time is up in the connection detection deciding timer, the CPU 101 obtains the ID of the relay board connected to each serial I/F on the CPU board 100 (Step S3107).

Next, the CPU 101 determines whether there is an ID=001 between the obtained IDs (Step S3109). Here, if there is an ID=001 between the obtained IDs, the CPU 101 controls an operation unit to display an connection error showing the irregular connection, and controls the printer 1P to prohibit the printing action (Step S3111) Thus, the CPU 101 finishes the present procedures.

However, if it is determined in the step S3109 that there is no ID=001, the CPU 101 starts the control corresponding to each relay board ID (Step S3113). Thus the CPU 101 finishes the present procedures.

Now, the sequence will be described when the power of the relay board 300 is on with reference to FIG. 15. The sequence shown in FIG. 16 is executed by the CPU 301.

As shown in FIG. 16, when the power of the relay board 300 is on, the serial I/F is initiated and the communication is started (Step S3001). Next, CPU 301 sets a connection detection deciding timer in order to detect the connection of the driver boards 5001 to 5004 (Step S3003), and whether the time is up in the connection detection deciding timer is determined (Step S3005). Here, when the time is up in the connection detection deciding timer, the CPU 301 obtains the ID data of the driver boards 5001 to 5004 connected to each serial I/F of the relay board 300 (Step S3007).

Next, the CPU 301 decides the relevant ID of the relay board from the connection relation table shown in FIG. 14, based on the obtained driver board IDs (Step S3009). Further, the CPU 301 determines whether the decided ID of the relay board is an ID of a controllable relay board (Step S3011). Here, if the decided ID of the relay board is not any one of "100"-"401", it is determined that the decided ID of the relay board is not the ID of the controllable relay board.

When it is determined that the ID of the relay board decided in the step S3011 is not the ID of the controllable relay board, the CPU 301 transmits the decided ID of the relay board to the CPU board 100 (Step S3013). Thus, The CPU 301 finishes the present procedures.

When it is determined that the ID of the relay board decided in the step S3011 is the ID of the controllable relay board, the CPU 301 transmits the decided ID of the relay board to the CPU board 100 (Step S3015). Further, the CPU 301 starts performing consistency control based on the decided ID of the relay board (Step S3017). Thus, the CPU 301 finishes the present procedures.

Although the IDs of the relay board are "100"-"401" or "001" for brevity of explanation in the present embodiment, it does not especially mean the IDs limit the number and kind of the relay boards.

In FIG. 16, the sequence is described when the power of the relay board 300 is on. However, the sequence is also executed when the power of the relay board 400 is on. Namely, when the power of the relay board 400 is on, the CPU 401 obtains the ID data of the high voltage generators 600a to 600d connected to a part of the connectors 404a to 404n in the relay board 400. Next, the CPU 401 decides the relevant ID of the relay board from the above connection relation table, based on the obtained ID data of the high voltage generators 600a to 600d. Further, the CPU 401 determines whether the decided ID of the relay board is an ID of a controllable relay board. When the decided ID of the relay board is not the ID of the controllable relay board, the CPU 401 transmits the decided ID of the relay board to the CPU 100, and the present procedures are terminated. On the other hand, when the decided ID of the relay board is the ID of the controllable relay board, the CPU 401 transmits the decided ID of the relay board to the CPU 100. Further, the CPU 401 starts performing consistency control, based on the decided ID of the relay board, and the CPU finishes the present procedures.

As described above, according to the present embodiment, each of a plurality of driver boards or high voltage generators which is classified according to a function thereof in the relay board and constituted as a controlled unit is connectable with any of a plurality of I/Fs with common standards in the relay board. Therefore, the development or diversion of the driver boards or high voltage generators become easier. As a result, the efficiency of development is improved, and the total development cost can be decreased.

Each of the CPUs on the relay boards such as the CPU 301 and the CPU 401 transmits the decided ID of the relay board to the CPU board 100 (Step S3015), and starts consistency control based on the decided ID of the relay board (Step S3017). On the other hand, the CPU board 100 obtains the ID of the relay board transmitted from each relay board (Step S3107), and starts control corresponding to each ID of the relay board. As a result, according to the control corresponding to the ID of the relay board by the CPU 100, the CPU 301 can perform consistency control between the driver boards connected to the relay board 300, based on the ID of the relay board 300. According to the control corresponding to the ID of the relay board by the CPU 100, the CPU 401 can perform consistency control between the high voltage generators connected to the relay board 400, based on the ID of the relay board 400.

Since the relay board decides its own ID, namely, control contents according to the connection states of the driver boards, connection change, or increase or decrease of the driver substrates can be easily treated, and errors caused by mistaken connection can be avoided in advance.

The CPU board determines whether the ID of the relay board is an ID of a controllable relay board, and gives a warning when the ID of the relay board is not the ID of the controllable relay board. Therefore, the CPU board can recognize a relay board to which an unexpected driver board is connected, and a glitch caused by the relay board can be avoided in advance.

While the present invention has been described with reference to exemplary embodiment, it is to be understood that the invention is not limited to the disclosed exemplary embodiment. The scope of the following claims is to be accorded the broadest interpretation so as to encompass all modifications, equivalent structures and function.

This application claims the benefit of Japanese Patent Application No. 2005-285060, filed Sep. 29, 2005, which is hereby incorporated herein in its entirety.

What is claimed is:

1. A control apparatus used in an image forming apparatus capable of equipping a plurality of units each of which is classified according to a function thereof and constituted as a controlled unit, the control apparatus comprising:
    at least one relay device comprising
    a plurality of interfaces that are connectable with said plurality of units, said plurality of interfaces having common standards,
    a detection section that detects each connection state of said plurality of units to said plurality of interfaces,
    a decision section that decides self-identification information for said relay device according to the connection state detected by said detection section,
    a consistency control section that performs consistency control to secure consistency of control between said plurality of units connected to said interfaces, based on the self-identification information for said relay device decided by said decision section; and
    a control device that is communicatably connected to said relay device, said control device obtaining the self-identification information for said relay device decided by said decision section from said relay device, and performing control according to the obtained self-identification information for said relay device.

2. A control apparatus according to claim 1, wherein said plurality of units are preliminarily provided each with uniquely identifiable unit identification information,
    said detection section detects each connection state of said plurality of units to said plurality of interfaces by obtaining each unit identification information of said plurality units connected to said plurality of interfaces via said plurality of interfaces, and
    said decision section decides the self-identification information for said relay device according to the connection state detected by said detection section, based on a combination of the obtained unit identification information.

3. A control apparatus according to claim 1, wherein said rely device performs the consistency control between said plurality of units connected to said plurality of interfaces according to the control by said control device corresponding to the decided self-identification information for the relay device, based on the self-identification information for the relay device decide by said decision section.

4. A control apparatus according to claim 1, wherein said control apparatus is connected with a warning section for giving a warning to a user, said control device determines whether the self-identification information for said relay device decided by said relay device is self-identification information for a controllable relay device, and when it is determined that the self-identification information for said relay device is self-identification information for a noncontrollable relay device, said control section controls said warning section to give a warning indicative of that effect.

5. An image forming apparatus having a control apparatus according to claim 1, and capable of equipping a plurality of units each of which is classified according to a function thereof and constituted as a controlled unit.

6. A control method for controlling a plurality of units and being executed by a control apparatus used in an image forming apparatus capable of equipping the plurality of units each of which is classified according to a function thereof and constituted as a controlled unit, said control apparatus being provided with a relay device having a plurality of interfaces that are connectable with the plurality of units, and a control device that is communicatably connected to the relay device, the plurality of interfaces having common standards, said control method comprising:
- a detection step of detecting each connection state of the plurality of units to the plurality of interfaces;
- a decision step of deciding self-identification information for the relay device according to the connection state detected in said detection step;
- a consistency control step of performing consistency control to secure consistency of control between the plurality of units connected to the interfaces, based on the self-identification information for the relay device decided in said decision step; and
- a control step of obtaining the self-identification information for the relay device decided in said decision step from the relay device, and performing control according to the obtained self-identification information for the relay device.

\* \* \* \* \*